United States Patent
Hozumi et al.

(10) Patent No.: US 9,376,257 B2
(45) Date of Patent: Jun. 28, 2016

(54) BELT TRACKING SYSTEM, MULTI-ROLLER ASSEMBLY AND IMAGE FORMING APPARATUS EMPLOYING SAME

(71) Applicants: Yoshiki Hozumi, Kanagawa (JP); Naomi Sugimoto, Kanagawa (JP); Yuuji Sawai, Kanagawa (JP); Kazuchika Saeki, Kanagawa (JP)

(72) Inventors: Yoshiki Hozumi, Kanagawa (JP); Naomi Sugimoto, Kanagawa (JP); Yuuji Sawai, Kanagawa (JP); Kazuchika Saeki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 49 days.

(21) Appl. No.: 13/960,098

(22) Filed: Aug. 6, 2013

(65) Prior Publication Data
US 2014/0083821 A1 Mar. 27, 2014

(30) Foreign Application Priority Data

Sep. 27, 2012 (JP) .................... 2012-213921
Apr. 5, 2013 (JP) .................... 2013-079421

(51) Int. Cl.
*B65G 15/64* (2006.01)
*G03G 15/16* (2006.01)

(52) U.S. Cl.
CPC ............ *B65G 15/64* (2013.01); *G03G 15/1615* (2013.01); *G03G 2215/00151* (2013.01)

(58) Field of Classification Search
CPC ............................... B65G 39/071; B65G 39/16
USPC ...................................................... 198/806
See application file for complete search history.

(56) References Cited

U.S. PATENT DOCUMENTS

| 7,810,633 | B2 | 10/2010 | Okamoto et al. | |
|---|---|---|---|---|
| 2012/0234656 | A1* | 9/2012 | Yamaoka | 198/806 |

FOREIGN PATENT DOCUMENTS

| CN | 101759046 A | 6/2010 |
|---|---|---|
| CN | 101907841 A | 12/2010 |
| CN | 101968617 A | 2/2011 |
| JP | 4-272042 | 9/1992 |
| JP | 2009-186910 | 8/2009 |
| JP | 2009-288426 | 12/2009 |
| JP | 2010-19899 A | 1/2010 |
| JP | 2010-230958 | 10/2010 |

OTHER PUBLICATIONS

U.S. Appl. No. 13/869,286, filed Apr. 24, 2013.
U.S. Appl. No. 13/859,192, filed Apr. 9, 2013.
(Continued)

*Primary Examiner* — Gene Crawford
*Assistant Examiner* — Lester Rushin
(74) *Attorney, Agent, or Firm* — Oblon, McClelland, Maier & Neustadt, L.L.P.

(57) ABSTRACT

A belt tracking system for controlling the lateral position of a movable belt entrained about a plurality of generally parallel rollers for moving in a trans-axial direction perpendicular to an axial direction in which the rollers extend parallel to each other includes a roller shaft, a slidable member, and a rotation restrictor. The roller shaft extends outward in the axial direction from an axial end of a specific one of the plurality of generally parallel rollers. The slidable member is slidably disposed around the roller shaft to move along the roller shaft as the belt moves laterally outward in the axial direction. The rotation restrictor is disposed adjacent to the slidable member to restrict rotation of the slidable member around the roller shaft.

15 Claims, 8 Drawing Sheets

(56) References Cited

OTHER PUBLICATIONS

U.S. Appl. No. 13/859,118, filed Apr. 9, 2013.

Combined Chinese Office Action and Search Report issued Jul. 8, 2015 in Patent Application No. 201310433770.0 (with English translation).

* cited by examiner

BELT TRACKING SYSTEM, MULTI-ROLLER ASSEMBLY AND IMAGE FORMING APPARATUS EMPLOYING SAME

CROSS-REFERENCE TO RELATED APPLICATION

The present patent application claims priority pursuant to 35 U.S.C. §119 from Japanese Patent Application Nos. 2012-213921 and 2013-079421, filed on Sep. 27, 2012 and Apr. 5, 2013, respectively, each of which is hereby incorporated by reference herein in its entirety.

BACKGROUND

1. Technical Field

The present invention relates to a belt tracking system, a multi-roller assembly and an image forming apparatus employing the same, and more particularly, to a belt tracking system for controlling the lateral position of a movable belt entrained about a plurality of rollers, and a multi-roller assembly and an image forming apparatus employing the belt tracking system.

2. Background Art

Image forming apparatuses employ various types of movable imaging belts, such as an intermediate transfer belt, a media conveyance belt, and a fixing belt, each of which is entrained about a plurality of generally parallel rollers for moving in a trans-axial direction perpendicular to an axial direction in which the rollers extend parallel to each other.

One problem associated with a multi-roller belt-support assembly is that the movable belt occasionally walks or moves laterally in the axial direction due to a lack of parallel alignment between the belt support rollers, which results, for example, from wear and tear of equipment used to rotate the belt support rollers. Such lateral displacement of the belt, if not corrected, would cause breakage or failure of the imaging process where the belt reaches the axial end of the roller and eventually slips off the belt-support assembly.

To address this problem, several techniques have been proposed which employ a belt tracking system connected to an axial end of the belt support roller to control the lateral position of the movable belt.

For example, there is known a belt tracking system in which a movable belt is entrained around a steering roller. The steering roller is equipped with a pair of rotary, slidable members each rotatably mounted to an axial end of the roller to define an inclined, conical interfacial surface therealong to slidably contact a stationary guide member. The system is designed to correct lateral displacement of the belt by tilting the steering roller as the slidable member slides against the stationary member along the inclined interfacial surface where the belt moves laterally outward to the axial end of the roller.

The inventors have recognized that, although generally successful, the belt tracking system that employs a slidable member slidable against a stationary guide member for tilting a steering roller does not work properly as intended, where the slidable member and the stationary guide member are subjected to significant friction at their interface, which would cause abrasion and damage to the interfacial surfaces, thereby detracting from reliability and durability of the belt tracking system.

BRIEF SUMMARY

Exemplary aspects of the present invention are put forward in view of the above-described circumstances, and provide a novel belt tracking system for controlling the lateral position of a movable belt entrained about a plurality of generally parallel rollers for moving in a trans-axial direction perpendicular to an axial direction in which the rollers extend parallel to each other.

In one exemplary embodiment, the belt tracking system includes a roller shaft, a slidable member, and a rotation restrictor. The roller shaft extends outward in the axial direction from an axial end of a specific one of the plurality of generally parallel rollers. The slidable member is slidably disposed around the roller shaft to move along the roller shaft as the belt moves laterally outward in the axial direction. The rotation restrictor is disposed adjacent to the slidable member to restrict rotation of the slidable member around the roller shaft.

Other exemplary aspects of the present invention are put forward in view of the above-described circumstances, and provide a multi-roller assembly employing the belt tracking system.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views, exemplary embodiments of the present patent application are described.

Figure 1:
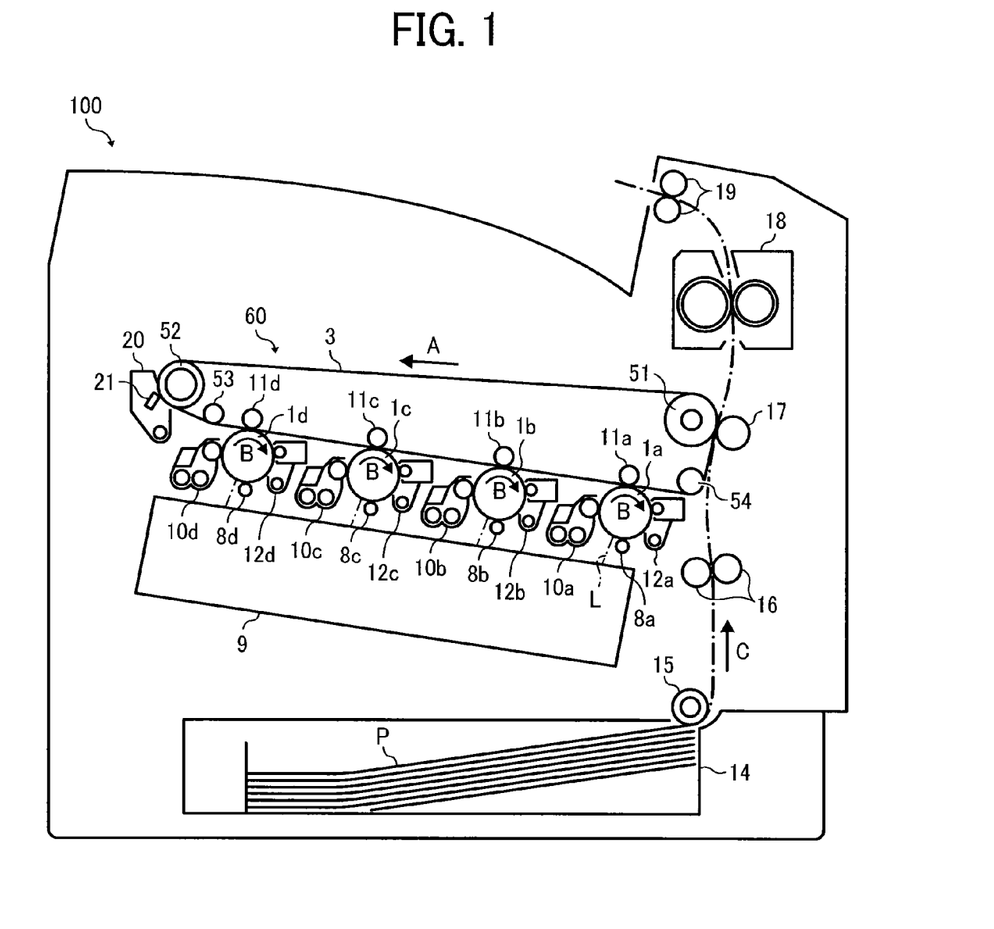
FIG. 1 is a schematic view of an image forming apparatus according to one or more embodiments of this patent specification.

FIG. 1 is a schematic view of an image forming apparatus 100 according to one or more embodiments of this patent specification.

As shown in FIG. 1, the image forming apparatus 100 comprises a tandem color printer that employs four imaging stations, including first through fourth photoconductors 1a, 1b, 1c, and 1d arranged in series, for forming toner images with four different colors: black, magenta, cyan, and yellow. Since the imaging stations are of an identical configuration except for the color of toner used for image formation, features of the photoconductor and its associated imaging equipment described herein apply to all the imaging stations unless otherwise indicated.

In each imaging station, the photoconductor 1 is rotatable in a direction indicated by arrow B, while surrounded by various pieces of imaging equipment, including a discharging device, a charging device 8, a development device 10, and a cleaning device 12, with an exposure device 9 directing a laser beam L to the photoconductive surface, which work in cooperation with each other to form a toner image on the photoconductive surface.

Also included in the image forming apparatus 100 is an intermediate transfer device 60 including an intermediate transfer belt 3 disposed opposite and in contact with the photoconductors 1a, 1b, 1c, and 1d. The intermediate transfer belt 3 is entrained about a plurality of belt support rollers, including a driver roller 51 equipped with a suitable rotary actuator and a tension roller 52 loaded with a suitable biasing mechanism, as well as idler rollers 53 and 54, aligned generally parallel to each other. As the driver roller 51 rotates, the belt 3 rotates in a direction indicated by arrow A in conjunction with the rollers 52, 53, and 54.

Four primary transfer rollers 11a, 11b, 11c, and 11d are disposed opposite the photoconductors 1a, 1b, 1c, and 1d, respectively, via the intermediate transfer belt 3 to form four primary transfer nips therebetween, through each of which the toner image is primarily transferred from the photoconductor 1 to the belt 3. A secondary transfer roller 17 is disposed opposite the belt support roller 51 via the intermediate transfer belt 3 to form a secondary transfer nip therebetween, through which the toner image is secondarily transferred from the belt 3 to a recording medium such as a sheet of paper P.

Additionally, a belt cleaner 20 may be disposed opposite the belt support roller 52 to remove untransferred, residual toner particles that remain on the belt surface after secondary image transfer.

In the present embodiment, the intermediate transfer belt 3 comprises a looped belt composed of one or more layers of material. In the case of a mono-layered belt, the belt material may be selected from polyvinylidene difluoride (PVDF), polycarbonate (PC), and polyimide (PI). In the case of a poly-layered belt, the belt may be formed of a substrate of relatively rigid fluorine rubber, PVDF, or polyimide resin, with a smooth coating of fluorine resin deposited on the substrate.

In the present embodiment, the belt cleaner 20 includes a cleaning blade 21 of suitable material, such as urethane, held against the belt 3 to mechanically remove or scrape toner residues from the belt surface. Alternatively, instead of or in combination with a cleaning blade, any suitable cleaning device may be used to clean the intermediate transfer belt 3, including, for example, an electrostatic cleaning device that incorporates an electrically conductive fur brush for electrostatically removing toner residues from the belt surface.

At the bottom of the apparatus 100 lies a sheet tray 14 accommodating a stack of recording sheets P. A feed roller 15 is disposed at an outlet of the sheet tray 14 to advance the recording sheet P in a direction indicated by arrow C into a sheet conveyance path defined by a suitable sheet conveyance device, including, for example, a movable belt entrained around a plurality of belt support rollers.

Along the sheet conveyance path is a pair of registration roller 16 for introducing the recording sheet P into the secondary transfer nip. A fixing device 18 is disposed downstream from the secondary transfer nip, which includes, for example, a movable belt entrained around a plurality of belt support rollers to fix the toner image on the recording sheet P. The sheet conveyance path terminates in an output unit including a pair of output rollers 19, which outputs the recording sheet P from inside the apparatus body.

During operation, in each imaging station, the photoconductor 1 rotates to forward its outer, photoconductive surface to a series of electrophotographic processes, including charging, exposure, development, transfer, and cleaning, in one rotation of the photoconductor 1.

First, after being exposed to light radiation from the discharging device, which removes residual electrical charges for initialization, the photoconductive surface is uniformly charged, for example, to a negative potential by the charging device 8 and subsequently exposed to a modulated laser beam L emitted from the exposure device 9. The laser exposure selectively dissipates the charge on the photoconductive surface to form an electrostatic latent image thereon according to image data representing a particular primary color. Then, the latent image enters the development device 10, which renders the incoming image visible using toner. The toner image thus obtained is forwarded to the primary transfer nip between the intermediate transfer belt 3 and the primary transfer roller 11.

At the primary transfer nip, the primary transfer roller 11 is supplied with a bias voltage of a polarity opposite that of the toner on the photoconductor 1 (for example, a positive bias voltage where the toner assumes a negative charge). This electrostatically transfers the toner image from the photoconductive surface to an outer surface of the belt 3, with a certain small amount of residual toner particles left on the photoconductive surface. Such transfer process occurs sequentially at the four primary transfer nips along the belt travel path, so that toner images of different colors are superimposed one atop another to form a single multicolor image on the surface of the intermediate transfer belt 3.

After primary transfer, the photoconductive surface enters the cleaning device 12 to remove residual toner, and then to the discharging device to remove residual charges for completion of one imaging cycle. At the same time, the intermediate transfer belt 3 forwards the multicolor image to the secondary transfer nip between the belt support roller 51 and the secondary transfer roller 17.

Meanwhile, in the sheet conveyance path, the feed roller 15 rotates to introduce a recording sheet P from the sheet tray 14 toward the pair of registration rollers 16 being rotated. Upon receiving the fed sheet P, the registration rollers 16 stop rotation to hold the incoming sheet P therebetween, and then advance it in sync with the movement of the intermediate transfer belt 3 to the secondary transfer nip. At the secondary transfer nip, the multicolor image is transferred from the belt 3 to the recording sheet P, with a certain small amount of residual toner particles left on the belt surface.

After secondary transfer, the intermediate transfer belt 3 enters the belt cleaner 20, which removes residual toner from the intermediate transfer belt 3. At the same time, the recording sheet P bearing the powder toner image thereon is introduced into the fixing device 20, which fixes the multicolor image in place on the recording sheet P with heat and pressure.

Thereafter, the recording sheet P is output by the output rollers 19 for stacking outside the apparatus body, which completes one operational cycle of the image forming apparatus 100.

A description is now given of specific features of the image forming apparatus 100 according to one or more embodiments of this patent specification. In each of these embodiments, a belt tracking system 50 is described employed in a multi-roller assembly, including a plurality of rollers about which an endless belt is entrained, which is applicable to the intermediate transfer device 60, the sheet conveyance device, and the fixing device 20 included in the image forming apparatus 100.

Figure 2A:
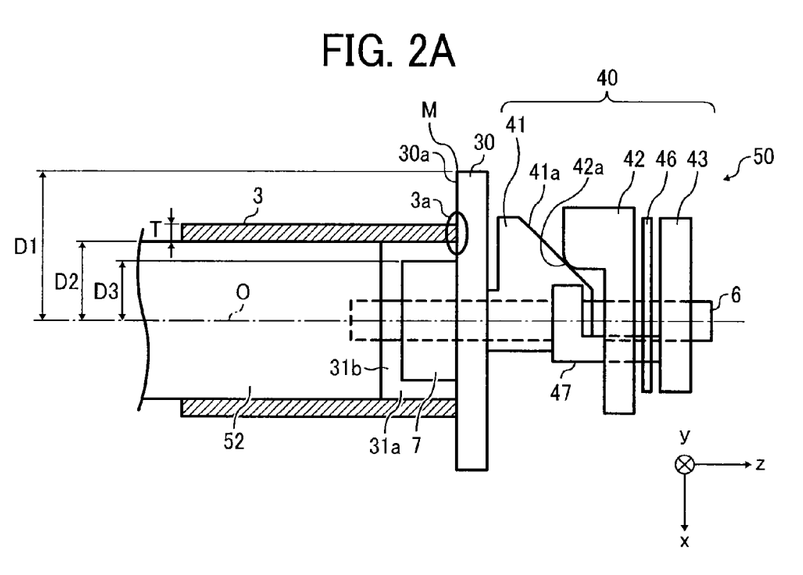
FIGS. 2A and 2B are cross-sectional views of the belt tracking system according to one embodiment of this patent specification.
Figure 2B:
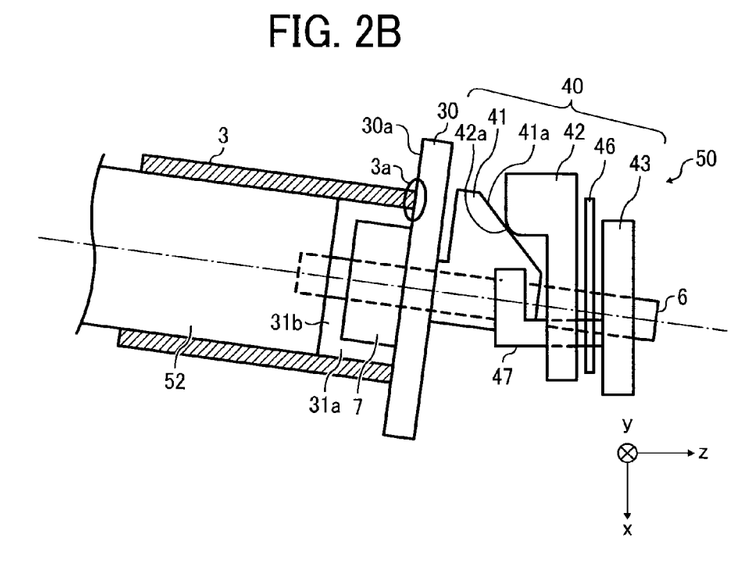

FIGS. 2A and 2B are cross-sectional views of the belt tracking system 50 according to one embodiment of this patent specification, exemplarily provided in the intermediate transfer device 60 included in the image forming apparatus 100 of FIG. 1.

As shown in FIGS. 2A and 2B, the intermediate transfer belt 3 is entrained about the plurality of generally parallel rollers 51 through 54, of which only one specific roller 52 is visible, for moving in a trans-axial direction perpendicular to an axial direction Z in which the rollers extend parallel to each other. The belt tracking system 50 is operatively connected to an axial end of the roller 52 (hereinafter occasionally referred to as a "steering roller") to control the lateral position of the belt 3 by inclining the roller 52 with respect to others of the plurality of generally parallel rollers 51 through 54.

As used herein, the term "axial direction" refers to a reference, longitudinal direction in which a central, rotational axis of the roller extends in its normal operational position, as indicated by the axis Z in the drawings. The terms "inward" and "outward", when used in connection with the axial direction, indicates an element moves or otherwise changes in position, size, and/or shape toward and away from, respectively, an axial, longitudinal center of the roller. The term "trans-axial direction" refers to a given direction perpendicular to the axial direction Z in which the belt is movable, as indicated by the axes X and Y in the drawings. In the present embodiment, for example, the trans-axial directions X and Y are vertical and horizontal, respectively.

The belt tracking system 50 includes a roller shaft 6 extending outward in the axial direction X from the axial end of the roller 52; a slidable member 41 slidably disposed around the roller shaft 6 to move along the roller shaft 6 as the belt 3 moves laterally outward in the axial direction X; and a positioning flange 30 operatively connected to the axial end of the roller 52 to define a contact surface 30a therealong extending generally perpendicular to the axial direction Z to contact an adjacent edge 3a of the belt 3. A position adjuster 40, of which the slidable member 41 forms part, is operatively connected to the axial end of the roller 52 to adjust position of the roller shaft 6 to in turn adjust the lateral position of the belt 3.

Specifically, in the present embodiment, the roller shaft 6 comprises a cylindrical body with a diameter smaller than that of the steering roller 52. The roller shaft 6 is coaxially mounted with the roller 52 to integrally rotate with the roller 52. The roller shaft 6 penetrates through the positioning flange 30 and the position adjuster 40, in particular, the slidable member 41, such that the positioning flange 30 and the slidable member 41 are movable along the roller shaft 6 generally in the axial direction Z.

The positioning flange 30 comprises an annular flange supported on the roller shaft 6 loosely, that is, without being fastened to the roller shaft 6 and the roller 52. Thus, the positioning flange 30 freely rotates around the roller shaft 6 as the belt 3 moves in the trans-axial direction to cause frictional contact between the belt edge 3a and the contact surface 30a. Also, the positioning flange 30 freely moves in the axial direction Z along the roller shaft 6 as the belt 3 moves laterally outward in the axial direction Z to exert pressure from the belt edge 3a against the contact surface 30a.

Compared to holding the flange stationary in position, allowing free rotation of the positioning flange 30 together with the belt 3 reduces load due to friction between the belt edge 3a and the contact surface 30a, thereby preventing damage to the belt 3 and abrasion on the contact surface 30a.

The contact surface 30a of the positioning flange 30 comprises a generally planar, flat surface with a circular peripheral shape concentric with the rotational axis of the roller 52. Alternatively, instead of a flat circular configuration, the contact surface 30a may be configured otherwise as long as the positioning flange 30 properly serves its intended function. Thus, the contact surface 30a includes any generally planar surface, including a curved surface, an irregular surface, or any combination thereof. Further, the peripheral shape of the contact surface 30a includes any closed geometric shape, such as a circle, an ellipse, a rectangle, a polygon, or any combination thereof.

The contact surface 30a may be shaped and dimensioned such that a distance D1 between a central, rotational axis O of the roller 52 and a periphery M of the contact surface 30a exceeds a sum of a radius D2 of the roller 52 and a thickness T of the belt 3.

For example, where the assembly is constructed with a roller radius D2 of 8.78 mm and a belt thickness T of 80 µm, the distance D1 (which is the radius of the circular contact surface 30a in the present case) may be set to a range greater than 8.86 mm, such as approximately 9.00 mm.

Setting the distance D1 to an appropriate range ensures the positioning flange 30 properly guides the belt edge 3a to the contact surface 30a without causing undue interference with surrounding structures. Such arrangement effectively prevents substantial displacement or walk of the belt, in which the belt reaches the axial end of the roller and eventually slips off the belt support roller.

With continued reference to FIGS. 2A and 2B, the position adjuster 40 is shown including, in addition to the slidable member 41, a stationary guide member 42 fixed in position adjacent to the roller shaft 6 to define a guide surface 42a therealong. The slidable member 41 is co-movably coupled with the roller shaft 6 to define an inclined surface 41a therealong inclined relative to the axial direction Z. The slidable member 41 is slidable against the stationary guide member 42 along the inclined surface 41a and the guide surface 42a to cause the roller shaft 6 to move in a direction perpendicular to the axial direction Z upon lateral displacement of the movable belt 3.

Specifically, in the present embodiment, the stationary guide member 42 comprises a stationary structure having an opening defined therein through which the roller shaft 6 is inserted and which accommodates movement of the roller shaft 6 during position adjustment. The stationary guide member 42 is positioned axially outward from, and in contact with, the slidable member 41. The stationary guide member 42 does not move in the axial direction Z upon displacement of the roller shaft 6 and the slidable member 41.

The guide surface 42a comprises any surface positioned adjacent to the roller shaft 6 to contact the inclined surface 41a of the slidable member 41. For example, in the present embodiment, the guide surface 42a is shaped into a chamfered edge that extends in the trans-axial direction Y and forms a circular arc in X-Z plane. Compared to a sharp-cornered edge, the chamfered guide edge 42a is superior in preventing abrasion on the interfacial surface 41a of the slidable member 41.

The slidable member 41 comprises an unfixed, movable structure having a through-hole defined therein for passing the roller shaft 6 therethrough. The slidable member 41 is positioned axially outward from, and in contact with, the positioning flange 30, so that the slidable member 41 may move along the roller shaft 6 as the positioning flange 30 moves laterally in the axial direction Z, for example, upon lateral movement of the belt 3.

The inclined surface 41a comprises any inclined surface positioned around the roller shaft 6 to contact the guide surface 42a of the stationary guide member 42. The inclined surface 41a slopes toward the roller shaft 6 outward in the axial direction Z. In the present embodiment, for example, the inclined surface 41a is disposed on an upper side of the roller shaft 6 and slopes downward toward the roller shaft 6. Alternatively, instead, the inclined surface 41a may be disposed on a lower side of the roller shaft 6 and slopes upward toward the roller shaft 6.

The inclined surface 41a may be angled at a suitable inclination angle of, for example, approximately 30 degrees relative to the roller shaft 6. Too large an inclination angle would cause an excessive load exerted between the adjoining interfacial surfaces 41a and 42a as the belt edge 3a strikes the positioning flange 30 to press the slidable member 41 against the stationary guide member 42. Conversely, too small an inclination angle would result in a large amount of displacement experienced by the slidable member 41 for inclining the roller 52, which translates into a relatively large space required to accommodate axial displacement of the slidable member 41, adding to the overall size of the belt assembly.

The inclined surface 41a may be configured as a curved inclined surface that exhibits curvature at least in a trans-axial plane X-Y perpendicular to the axial direction Z. Specific examples of the inclined surface 41a include, but are not limited to, a conical surface, a cylindrical surface, a spherical surface, and combinations thereof.

Figure 3:
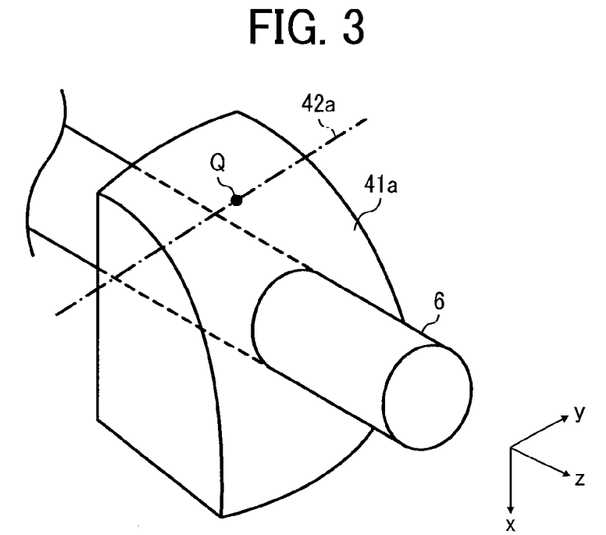
FIG. 3 is a perspective view of an example of a slidable member included in the belt tracking system of FIGS. 2A and 2B.
Figure 4:
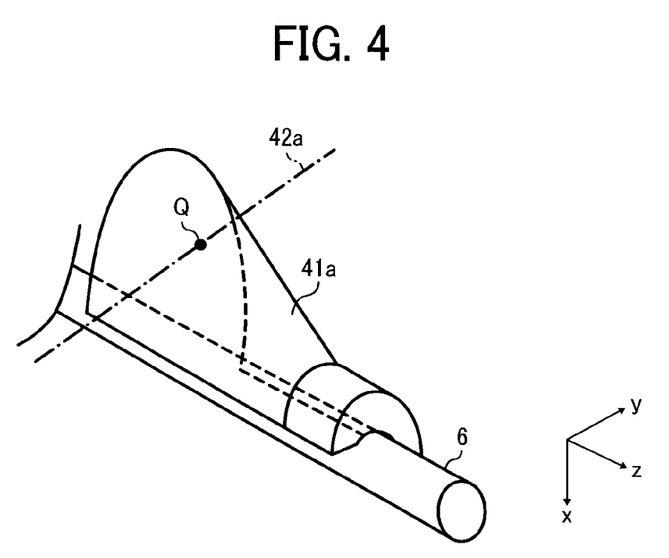
FIG. 4 is a perspective view of another example of the slidable member.

For example, the inclined surface 41a may be shaped into a cylindrical or spherical surface, as shown in FIG. 3. Alternatively, instead, the inclined surface 41a may be shaped into a conical surface, as shown in FIG. 4. In the case of the conical configuration, the vertex of the inclined surface 41a may be located coincident with the central axis of the roller shaft 6, which maintains a constant angle or orientation at which the slidable member 41 contacts the stationary guide member 42 during movement of the roller shaft 6.

As mentioned earlier, the guide surface 42a in the present embodiment is shaped into a chamfered edge extending in the trans-axial direction Y, as indicated by imaginary straight lines in FIGS. 3 and 4. In such cases, curvature of the inclined surface 41a in the trans-axial plane X-Y allows the interfacial surfaces 41a and 42a of the slidable member 41 and the stationary guide member 42 to contact each other at a specific point Q, rather than along a line or across an area.

Such arrangement effectively reduces the chances of abrasion spreading over an extended area due to friction between the slidable member 41 and the stationary guide member 42, while allowing for smooth movement of the slidable member 41 along the stationary guide member 42 upon lateral displacement of the movable belt 3, leading to reduced loads on the belt edge 3a.

With reference to FIGS. 2A and 2B, a description is given of an operation of the belt tracking system 50 correcting the lateral position of the movable belt 3.

During operation, as the driver roller 51 rotates, the belt 3 rotates or moves in the trans-axial direction Y to in turn cause the steering roller 52 to rotate. As the belt 3 moves laterally outward in the axial direction Z along the roller 52, for example, due to a lack of parallel alignment between the belt-supporting rollers, the contact surface 30a of the positioning flange 30 contacts the belt edge 3a to prevent further displacement of the belt 3, thereby maintaining the belt 3 in its proper lateral position in the axial direction Z.

Where the belt 3 is in its proper operational position, the belt edge 3a merely touches or slightly contacts the positioning flange 30 with only a small contact pressure applied from the belt edge 3a to the positioning flange 30, which does not cause the positioning flange 30 to move outward in the axial direction Z. At this point, the roller shaft 6 remains in its normal position parallel to the axial direction Z, as shown in FIG. 2A.

Where the belt 3 moves laterally outward in the axial direction Z, the contact pressure from the belt edge 3a to the positioning flange 30 increases to cause the positioning flange 30 to move outward in the axial direction Z against the slidable member 41, so that the slidable member 41 slides downward against the stationary guide member 42 along their interfacial surfaces 41a and 42a. With the slidable member 41 thus descending, the roller shaft 6, which penetrates through, and therefore is co-movable with, the slidable member 41, is forced downward in the vertical, trans-axial direction X perpendicular to the axial direction Z.

As a result, the steering roller 52, having its one axial end vertically displaced and the other axial end held in position, becomes tilted or inclined relative to other rollers included in the multi-roller assembly, as shown in FIG. 2B. Such inclination of the roller 52 eventually causes the belt 3 to move laterally inward to resume its proper operational position in the axial direction Z, as described below with additional reference to FIGS. 5A and 5B.

Figure 5A:
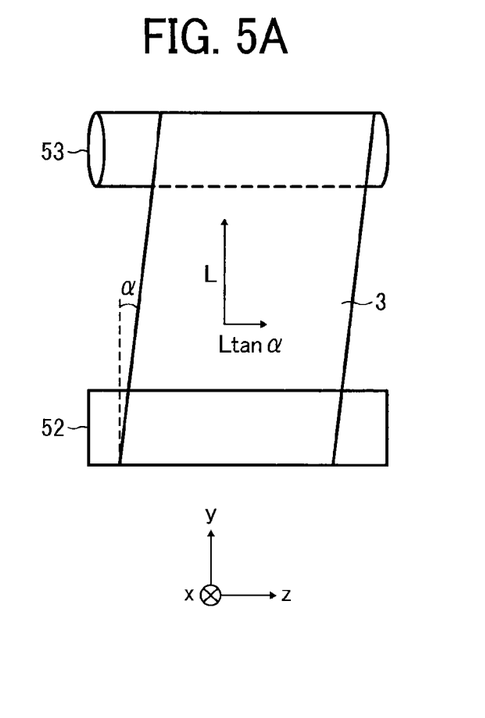
FIGS. 5A and 5B are schematic plan views of a movable belt entrained around multiple rollers inclined relative to each other.

As shown in FIG. 5A, the belt 3 may experience lateral displacement due to a lack of parallel alignment between the two belt support rollers 52 and 53, the former being exactly parallel to the axial direction Z and the latter being slightly tilted away from the axial direction Z (i.e., having its left end closer to the viewer than its right end in the drawing). Thus, the belt 3 has its longitudinal axis angled at a clockwise angle α away from the trans-axial direction Y.

At this point, where the belt 3 travels a distance L in the trans-axial direction Y, a given point on the belt surface moves by an amount L*tan α to one side (i.e., the right side in the drawing) in the axial direction Z.

Figure 5B:
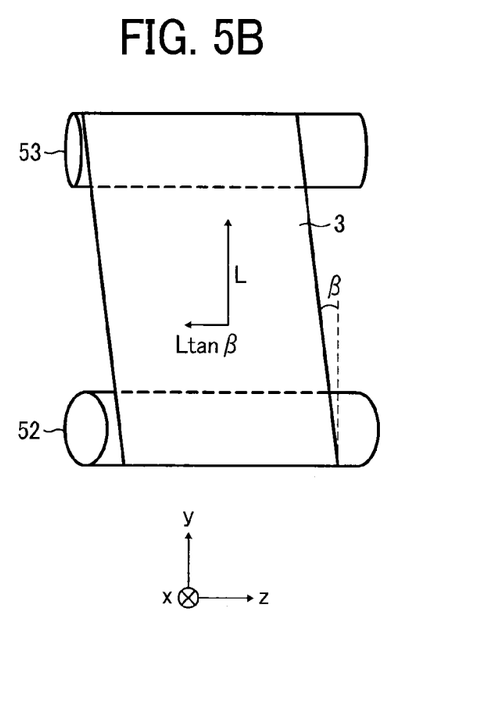

As shown in FIG. 5B, as the lateral displacement of the belt 3 shifts the axial end of the roller 52 in the trans-axial direction X perpendicular to the axial direction Z, the roller 52 becomes angled away from parallel alignment (i.e., having its left end closer to the viewer than its right end in the drawing) whereas the roller 53 remains in its original angular position.

Note that the roller 52 is now tilted away from the axial direction Z at a greater angle than the other roller 53. This difference in tilting angle between the belt support rollers 52 and 53, that is, inclination of the roller 52 with respect to the other roller 53, results in a counterclockwise angle β at which the longitudinal axis of the belt 3 is angled away from the trans-axial direction Y.

At this point, as the belt 3 travels a distance L in the trans-axial direction Y, a given point on the belt surface moves by an amount L*tan β to the side opposite that to which belt displacement took place in the axial direction Z before tilting of the roller 52.

As the amount of displacement L*tan α experienced by the belt 3 to one lateral side is cancelled out by the amount of displacement L*tan β to the other lateral side, the belt 3 can remain within a desired operational position in the axial direction Z to allow for proper functioning of the imaging equipment.

Thus, the belt tracking system 50 corrects lateral displacement of the belt 3 by tilting the steering roller 52 as the slidable member 41 slides against the stationary guide member 42 along their contact, interfacial surface 41a and 42a where the belt 3 moves laterally outward to the axial end of the roller 52.

With continued reference to FIGS. 2A and 2B, the belt tracking system 50 is shown further including a spacer 7 interposed between the axial end of the roller 52 and the contact surface 30a of the flange 30 to prevent the belt edge 3a from bending away from the positioning flange 30, for example, due to gravity forcing the belt edge 3a downward.

Specifically, in the present embodiment, the spacer 7 comprises an annular cylinder coaxially mounted around the shaft 6 of the roller 52. The annular cylindrical spacer 7 has a radius D3 dimensioned smaller than the radius D2 of the roller 52 to create a generally annular gap 31a between the adjacent surfaces of the belt 3 and the spacer 7. It is to be noted that the spacer 7 may be configured in any suitable regular or irregular geometric shape, including not only cylinders, but also spheres, cubes, and other polygonal prisms, which properly serves its intended function.

More specifically, in the present embodiment, the spacer 7 is spaced apart from the roller 52 to create an axial gap 31b between the adjacent surfaces of the roller 52 and the spacer 7 in the axial direction Z.

Provision of the axial gap 31b prevents an accidental contact of the roller 52 with the spacer 7 due to dimensional variations over time, which would otherwise result in an irregular pressure exerted from the roller 52 to the positioning flange 30 via the spacer 7. Such arrangement ensures inclination of the roller 52 takes place only where the belt edge 3a strikes the positioning flange 30, so that the roller 52 is inclined at a proportional angle of inclination with respect to the other belt-supporting rollers upon lateral displacement of the belt 3 (i.e., the greater the lateral displacement of the belt 3, the greater the angle of inclination of the roller 52, and vice versa), leading to proper adjustment to the lateral position of the belt 52 through inclination of the roller 52.

Figure 6:
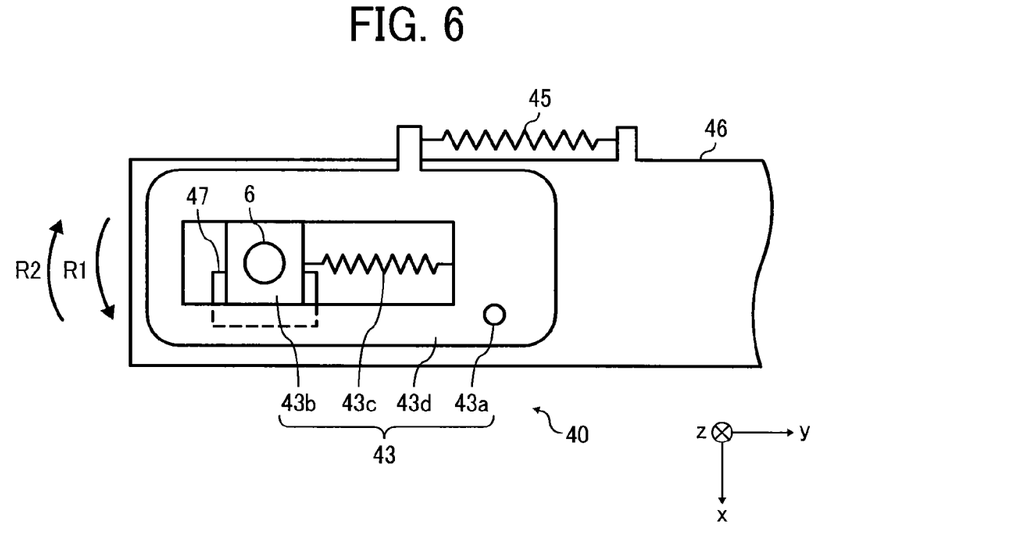
FIG. 6 is a side elevational view of the belt tracking system of FIGS. 2A and 2B.

FIG. 6 is a side elevational view of the belt tracking system 50 of FIGS. 2A and 2B.

As shown in FIG. 6, the position adjuster 40 includes, in addition to the slidable member 41 and the stationary guide member 42, a stationary support 46 fixed in position, and a swivelable member 43 co-movably coupled with the roller shaft 6, while pivoted at a pivot point on the stationary support 46.

In the present embodiment, the stationary support 46 comprises a stationary structure having an opening defined therein through which the roller shaft 6 is inserted and which accommodates movement of the roller shaft 6 during position adjustment. The stationary support 46 is positioned axially outward from the stationary guide member 42. The stationary support 46 does not move in the axial direction Z where the roller shaft 6 moves or is displaced.

The swivelable member 43 comprises a composite structure constructed of a hinged plate 43d located axially outward from the stationary support 46; a hinge or pivot 43a provided between the stationary support 46 and the plate 43d around which the plate 43d rotates as the roller shaft 6 moves in a direction perpendicular to the axial direction Z; a bearing 43b disposed around the roller shaft 6 and fixed in rotational position relative to the roller shaft 6; and an elastic bias member 43c connecting the bearing 43b to the hinged plate 43d to exert a biasing force on the roller shaft which elastically biases the roller 52 against the belt 3.

Provision of the swivelable member 43 with the elastic bias member 43c allows the roller 52 to function as a tension roller that forces the belt 3 away from the other belt-supporting rollers to maintain tension in the belt 3. The elastic bias member 43c for biasing the tension roller 52 may be formed of any suitable elastic material, such as a coil spring, a leaf spring, a rubber band, or the like.

Additionally, in the present embodiment, the position adjuster 40 also includes an elastic retention member 45 connected between the swivelable member 42 and the stationary support 46 to elastically retain the roller shaft 6 in position. The elastic retention member 45 comprises a coil spring disposed in tension between the stationary support 46 and the swivelable member 43. Alternatively, instead of a coil spring, the elastic retention member 45 may be configured as any suitable elastic material, such as a leaf spring, a rubber band, or the like.

During operation, where the roller shaft 6 moves downward in the vertical, trans-axial direction X for correcting the lateral position of the belt 3, the swivelable member 43 rotates in a first rotational direction R1, counterclockwise in FIG. 6, around the pivot 43a.

As rotation of the swivelable member 43 causes the elastic retention member 45 to stretch, the resultant elastic force, which opposes the change in length of the elastic retention member 45, causes the swivelable member 43 to rotate backward in a second rotational direction R2, clockwise in FIG. 6, around the pivot 43a.

Thus, with the elastic retention member 45 connected between the swivelable member 43 and the stationary support 46, the roller shaft 6, which is co-movable with the swivelable member 43, tends to move upward after being displaced downward in the trans-axial direction X. Such elastic retention of the roller shaft 6 prevents the slidable member 41 from falling off the stationary guide member 42 due to gravity, leading to continuous contact between the interfacial surfaces 41a and 42a of the slidable member 41 and the stationary guide member 42, which allows for more reliable operation of the belt tracking system 50.

Referring back to FIGS. 2A and 2B, a description is now given of specific features of the belt tracking system 50 according to several embodiments of this patent specification.

As shown in FIGS. 2A and 2B, the belt tracking system 50 includes, in addition to the roller shaft 6 extending outward in the axial direction X from the axial end of the roller 52, and the slidable member 41 slidably disposed around the roller shaft 6 to move along the roller shaft 6 as the belt 3 moves laterally outward in the axial direction X, a rotation restrictor 47 disposed adjacent to the slidable member 41 to restrict rotation of the slidable member 41 around the roller shaft 6.

During operation, the slidable member 41 is occasionally subjected to torque transmitted through friction from the roller shaft 6 rotating as the roller 52 rotates, or from the positioning flange 30, which in the present embodiment is freely rotatable around the roller shaft 6. In such cases, the rotation restrictor 47 secures the slidable member 41 in position against the transmitted torque, such that the slidable member 41 does not rotate around the roller shaft 6 in a trans-axial plane X-Y perpendicular to the axial direction Z.

Provision of the rotation restrictor 47 protects the slidable member 41 against abrasion and damage due to significant friction at an interfacial surface where the slidable member 41 contacts an adjacent structure, thereby allowing for the reliable, durable belt tracking system 50 that can operate reliably without failure for an extended period of time.

The inventors have recognized that, although generally successful, the belt tracking system that employs a slidable member slidable against a stationary guide member for tilting a steering roller does not work properly as intended, where the slidable member and the stationary guide member are subjected to significant friction at their interface, which would cause abrasion and damage to the interfacial surfaces, thereby detracting from reliability and durability of the belt tracking system.

Figure 7A:
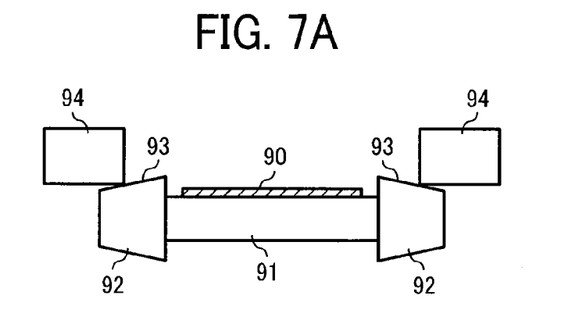
FIGS. 7A and 7B are schematic elevational views of an exemplary belt tracking system.
Figure 7B:
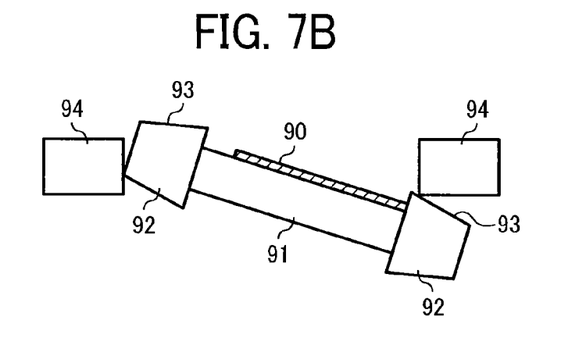

With reference to FIGS. 7A and 7B, consider an exemplary belt tracking system in which a movable belt 90 is entrained around a steering roller 91. The steering roller 91 is equipped with a pair of rotary, slidable members 92 each rotatably mounted to an axial end of the roller 91 to define an inclined, conical interfacial surface 93 therealong to slidably contact a stationary guide member 94. The system is designed to correct the lateral position of the belt 90 by tilting the roller 91 as the slidable member 92 slides against the stationary member 94 along the inclined interfacial surface 93 where the belt 90 moves laterally outward to the axial end of the roller 91.

Specifically, as shown in FIG. 7A, where the belt 90 is in its neutral, proper operational position, the belt edge does not contact either of the pair of slidable members 92 on the opposed axial ends of the roller 91. At this point, the roller 91 remains in its horizontal position with the slidable members 92 symmetrically located with their interfacial surfaces in contact with the respective stationary guide members 94.

As shown in FIG. 7B, where the belt 90 is displaced laterally (in this case, to the right side of the drawing), the belt edge contacts and presses against the slidable member 92 on one axial end of the roller 91. As a result, the slidable member 92 on that axial end slides downward against the stationary member 94, whereas the slidable member 92 on the other axial end moves upward, thereby tilting the roller 91 to counteract the lateral displacement of the belt 90.

In the belt tracking system, the inclined surface 93 of the rotary, slidable member 92 is subjected to a sliding, frictional contact with the stationary guide member 94 not only where the slidable member 92 moves outward in the axial direction upon lateral displacement of the belt 90, but also where the slidable member 92 rotates as the steering roller 91 rotates. Significant friction caused by rotation of the slidable member 92 relative to the stationary guide member 94, if not corrected, would result in accelerated abrasion and damage to their interfacial surfaces, leading to reduced reliability and durability of the belt tracking system.

These and other problems are effectively addressed by the belt tracking system 50 according to this patent specification, owing to provision of the rotation restrictor 47 disposed adjacent to the slidable member 41 to restrict rotation of the slidable member 41 around the roller shaft 6. Without the rotation restrictor 47, rotation of the slidable member 41 around the roller shaft 6 would cause significant friction at the interface between the slidable member 41 and the stationary guide member 42, thereby causing accelerated abrasion and damage to their interfacial surfaces.

Thus, provision of the rotation restrictor 47 protects the slidable member 41 and the stationary guide member 42 against abrasion and damage due to significant friction at their interface, thereby allowing for the reliable, durable belt tracking system 50 that can operate reliably without failure for an extended period of time.

With continued reference to FIGS. 2A and 2B, the rotation restrictor 47 is shown fixed in rotational position relative to the roller shaft 6. The rotation restrictor 47 may be fixed in rotational position relative to the roller shaft 6 by itself, or alternatively, may be integrally connected with a fixed member fixed in rotational position relative to the roller shaft 6.

The term "integrally connected" as used herein refers to direct or indirect connection between the rotation restrictor 47 and the fixed member, which includes any type of affixation or attachment that joins the rotation restrictor 47 and the fixed member together such that they function as a single unit, and does not require the rotation restrictor 47 and the fixed member be made as a single, continuous piece.

Figure 8:
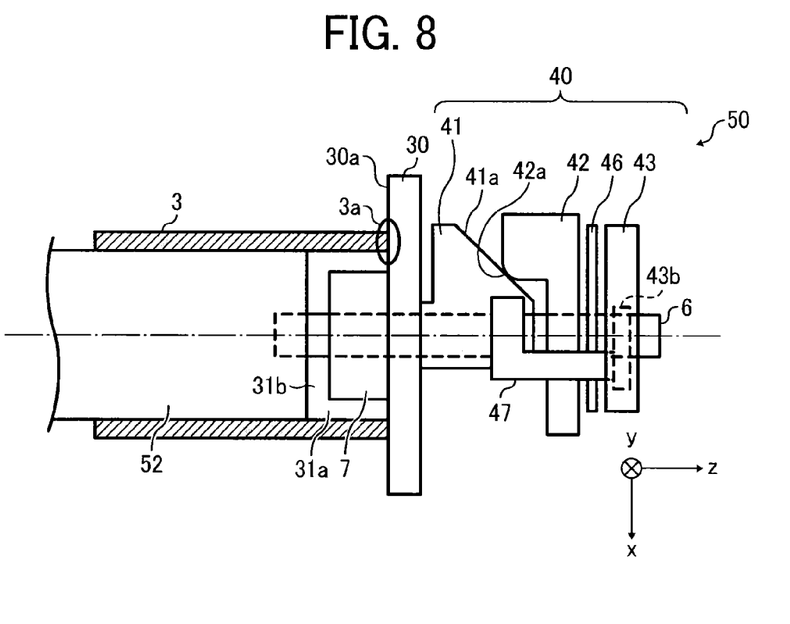
FIG. 8 is a cross-sectional view of the belt tracking system according to another embodiment of this patent specification.

Specifically, in the present embodiment, the rotation restrictor 47 is integrally connected with the swivelable member 43, which is co-movably coupled with the roller shaft 6, while pivoted at a pivot point on the stationary support 46, as shown in FIGS. 2A and 2B. More specifically, the rotation restrictor 47 may be integrally connected with the bearing 43*b* disposed around the roller shaft 6 and fixed in rotational position relative to the roller shaft 6, as shown in FIG. 8.

Integral connection of the rotation restrictor 47 with the bearing 43*b* provides effective restriction on rotation of the slidable member 41 without hindering trans-axial movement of the roller shaft 6 as the elastic bias member 43*c* extends and compresses to maintain a proper tension in the belt 3. It should be noted that this arrangement is particularly applicable to a configuration in which the belt tracking system 50 is provided to the tension roller 52, as opposed to the others of the plurality of belt support rollers 51, 53, and 54.

The rotation restrictor 47 may be configured as a flange extending from a fixed member fixed in rotational position relative to the roller shaft 6 to contact the slidable member 41. Alternatively, instead, the rotation restrictor may be configured as a flange extending from the slidable member 41 to contact a fixed member fixed in rotational position relative to the roller shaft 6. Specific examples of the rotation restrictor 47 are shown with reference to FIGS. 9 through 12.

Figure 9:
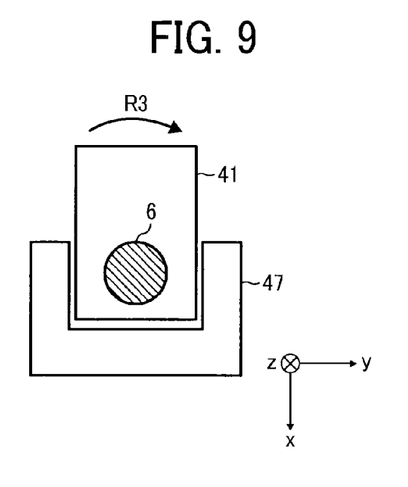
FIG. 9 is a schematic view of an example of a rotation restrictor included in the belt tracking system of FIGS. 2A and 2B.
Figure 10:
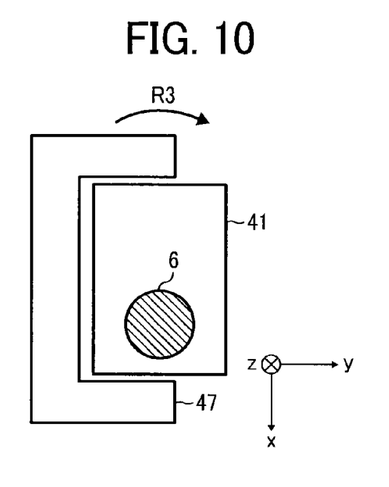
FIG. 10 is a schematic view of another example of the rotation restrictor.

For example, the rotation restrictor 47 may be configured as a flange extending from the bearing 43*b* to contact the slidable member 41. In such cases, the flange 47 may have a generally U-shaped cross section in X-Y plane to fit along a bottom and two opposed sides of the slidable member 41, as shown in FIG. 9. Alternatively, instead, the flange 47 may have a generally U-shaped cross section in X-Y plane to fit along a top, bottom and one side of the slidable member 41, as shown in FIG. 10.

Figure 11:
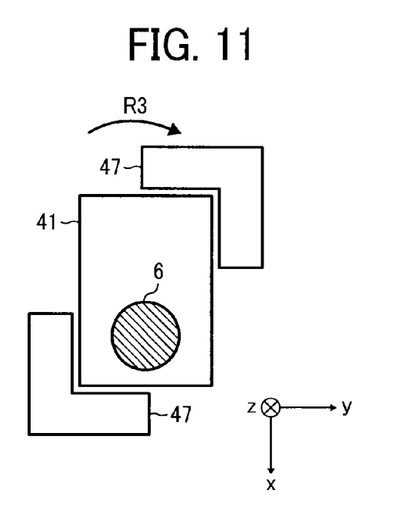
FIG. 11 is a schematic view of still another example of the rotation restrictor.

Further, instead of a single flange, the rotation restrictor 47 may be configured as a pair of flanges extending from the bearing 43*b* to contact the slidable member 41. In such cases, each of the pair of flanges 47 may have a generally L-shaped cross section in X-Y plane to fit along two adjoining sides of the slidable member 41, as shown in FIG. 11.

Figure 12:
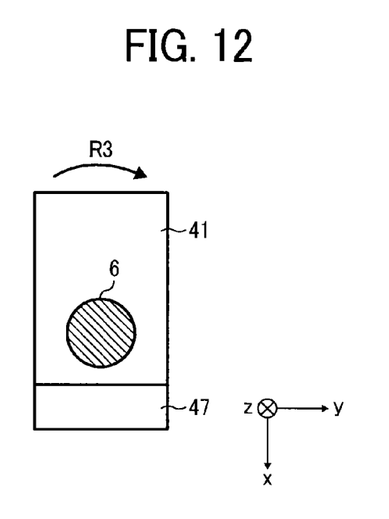
FIG. 12 is a schematic view of yet still another example of the rotation restrictor.
Figure 13A:
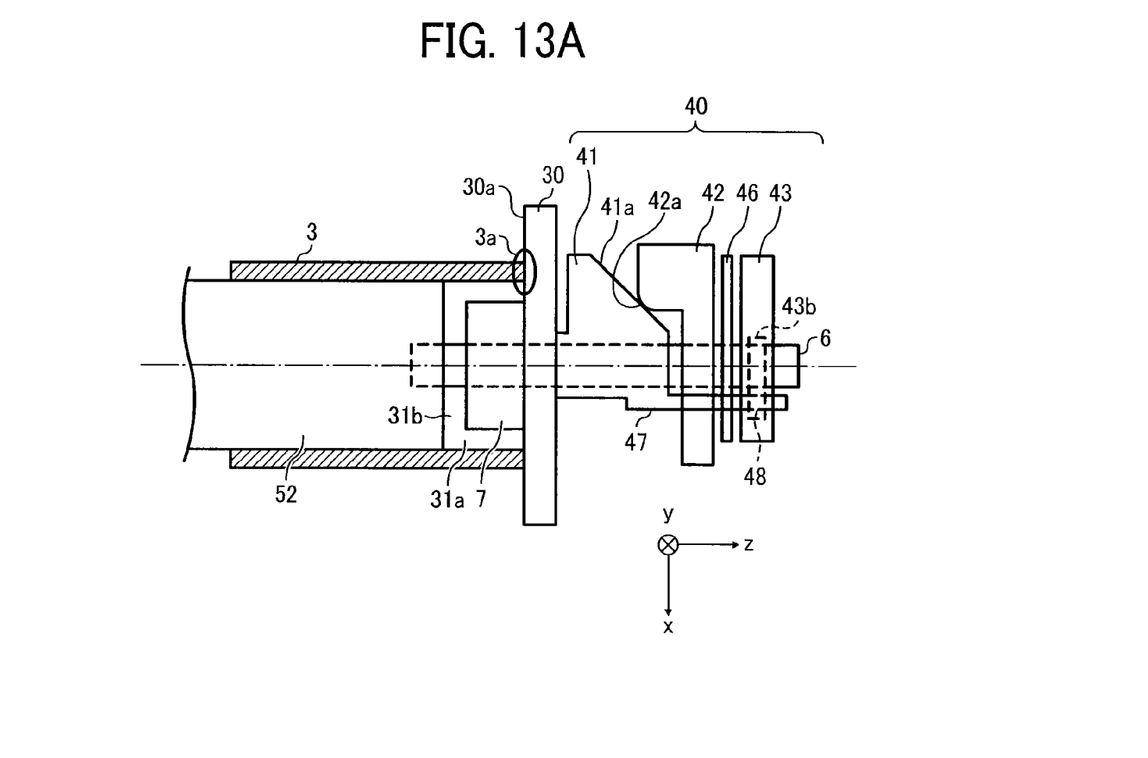
FIGS. 13A and 13B are cross-sectional and side elevational views of the belt tacking system according to another embodiment of this patent specification.
Figure 13B:
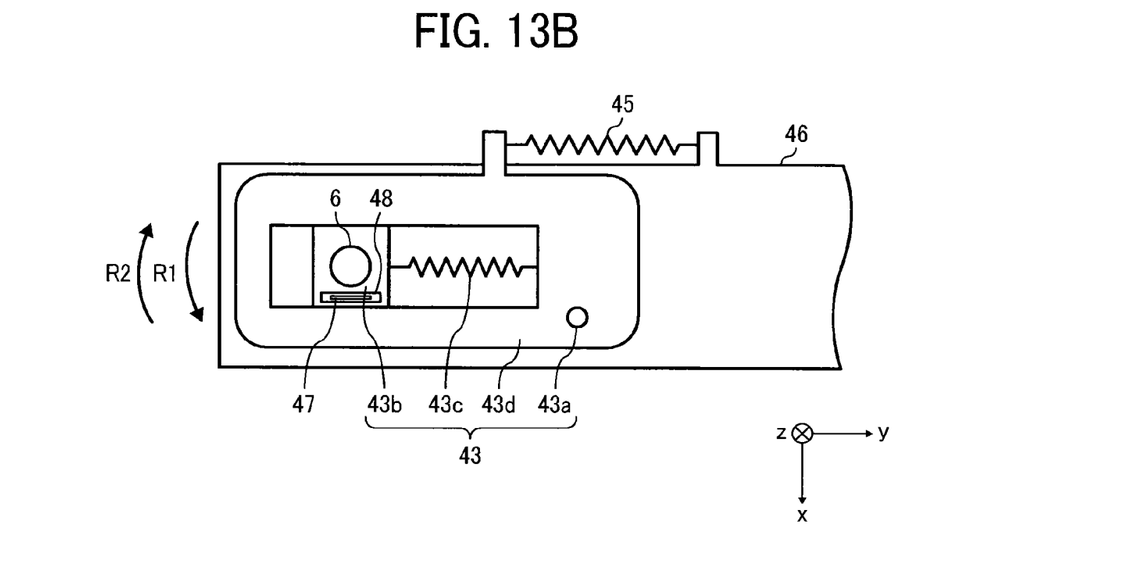

Furthermore, instead of a flange extending from the bearing 43*b* to contact the slidable member 41, the rotation restrictor 47 may be configured as a flange extending from the slidable member 41 to contact the bearing 43*b*, as shown in FIG. 12. In such cases, the flange 47 may pass through a slit 48 provided in the bearing 43*b*, as shown in FIGS. 13A and 13B.

In each of these configurations, the rotation restrictor 47 effectively resists torque that forces the slidable member 41 around the roller shaft 6 in a rotational direction R3 in X-Y plane, while allowing occasional movement of the slidable member 41 in X-Z plane, for example, where the belt edge 3a exerts pressure against the slidable member 41 via the positioning flange 30 in the axial direction Z.

Although in several embodiments described above, the rotation restrictor 47 is depicted as being attached to the bearing 43b, the fixed member with which the rotation restrictor 47 is integrally connected is not limited to the bearing 43b, but includes any portion of the belt tracking system 50 that is fixed in rotational position relative to the roller shaft 6.

For example, the rotation restrictor 47 may be integrally connected with other portions of the swivelable member 43 than the bearing 43b. Further, in a configuration in which the positioning flange 30 does not rotate around the roller shaft 6, the rotation restrictor 47 may be integrally connected with the positioning flange 30. Furthermore, the rotation restrictor 47 may be integrally connected with the stationary guide member 42 or the stationary support 46, instead of the swivelable member, particularly in a configuration in which the belt tracking system 50 is provided to one of the plurality of belt support rollers other than the tension roller 52.

Figure 14:
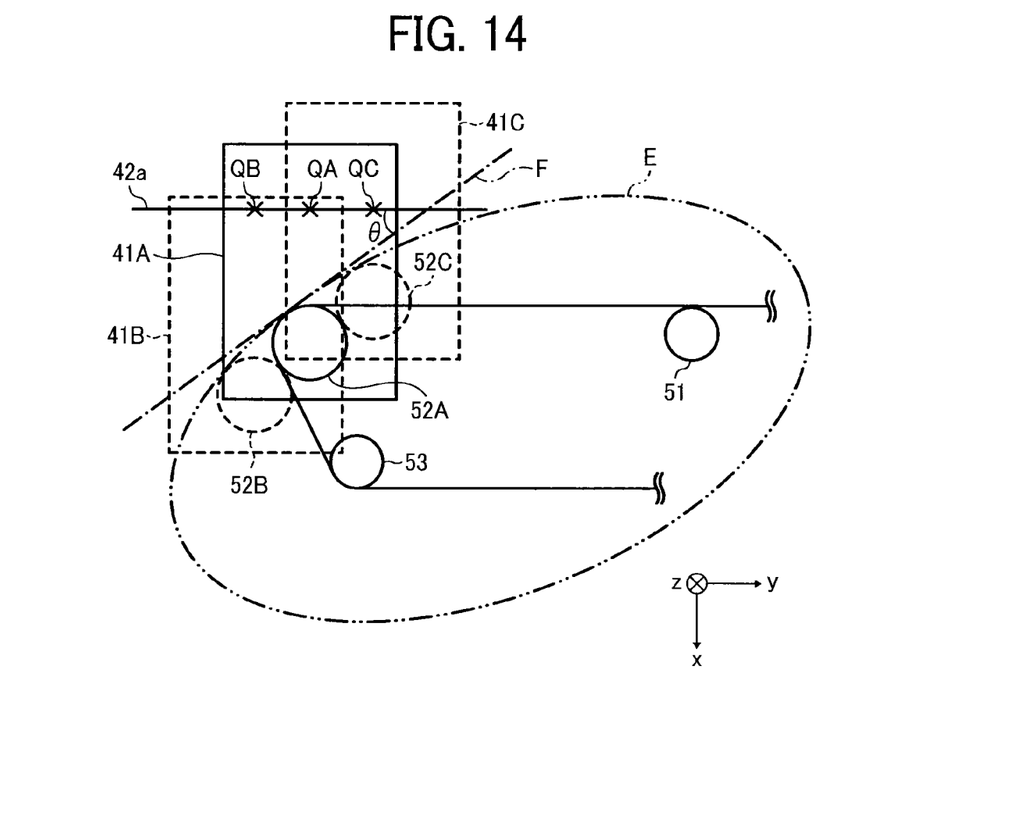
FIG. 14 is a schematic view of a multi-roller assembly employing the belt tracking system of FIGS. 2A and 2B.

FIG. 14 is a schematic view of the multi-roller assembly employing the belt tracking system 50.

As shown in FIG. 14, in the present embodiment, the movable belt 3 is entrained about at least three generally parallel rollers 51 through 54, including the roller 52 to which the belt tracking system 50 is provided, such that the axial end of the roller 52 is movable in an elliptical path E whose foci coincide with adjacent two of the at least three generally parallel rollers, which are, in this case, the rollers 51 and 53, where the endless belt 3 has a generally constant circumferential length.

The guide surface 42a extends at an oblique angle θ with respect to a common tangential line F between the elliptical path E and the axial end of the roller 52 where the roller 52 extends parallel to the adjacent rollers 51 and 53. The oblique angle θ may be any angle other than 90°, such as, for example, an angle in a range from approximately 77° to approximately 82°.

In such a configuration, as long as the roller 52 extends parallel to the adjacent rollers 51 and 53, the axial end of the roller 52 remains in an initial operational position 52A. At this point, the slidable member 41 remains in an initial operational position 41A to contact the stationary guide member 42 at a point of contact QA.

As the roller 52 is inclined generally downward in the vertical trans-axial direction X, the axial end of the roller 52 is displaced to a first displacement position 52B closer to the downstream adjacent roller 53. At this point, the slidable member 41 is displaced to a corresponding displacement position 41B to contact the stationary guide member 42 at a point of contact QB.

As the roller 52 is inclined generally upward in the vertical trans-axial direction X, the axial end of the roller 52 is displaced to a second displacement position 52C closer to the upstream adjacent roller 51. At this point, the slidable member 41 is displaced to a corresponding displacement position 41C to contact the stationary guide member 42 at a point of contact QC.

Thus, the slidable member 41 and the stationary guide member 42 contact each other at different points of contact QA, QB, and QC as the slidable member 41 slides against the stationary guide member 42 along the inclined surface 41a and the guide surface 42a. Varying the point of contact Q between the slidable member 41 and the stationary guide member 42 prevents concentration of loads on a particular point across the guide surface 42a, which would otherwise result in accelerated abrasion and damage to the stationary guide member 42.

Figure 15:
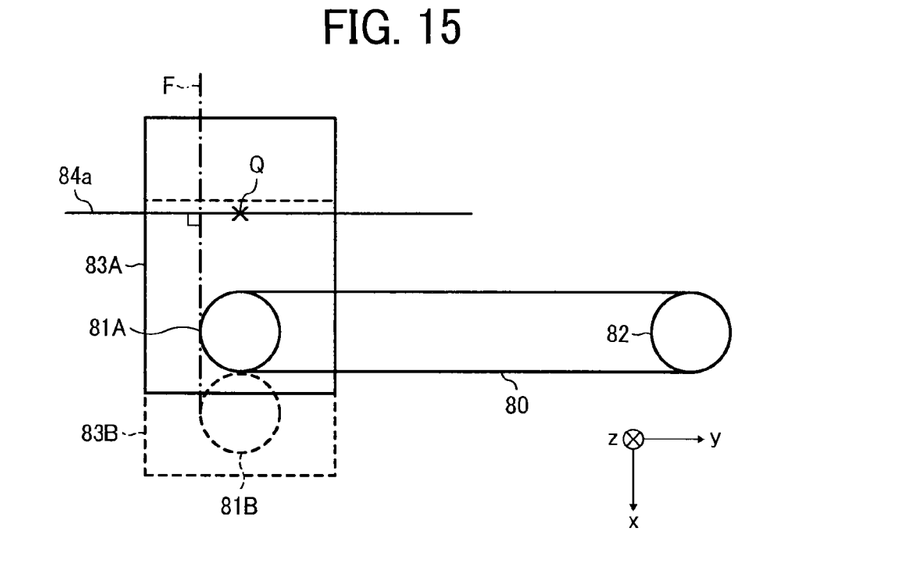
FIG. 15 is a schematic view of an exemplary belt tracking system.

For comparison purposes, and for facilitating a ready understanding of the effects of providing the guide surface 42a obliquely with respect to the common tangential line F, a comparative, exemplary embodiment is illustrated, with reference to FIG. 15.

As shown in FIG. 15, in this comparative embodiment, an endless belt 80 is entrained around two rollers 81 and 82. The roller 81 is provided with a slidable member 83 slidable against a stationary guide member 84 extending at a right angle with respect to a common tangential line F between an imaginary circular path in which the roller end is movable, and the axial end of the roller 81 where the roller 81 extends parallel to the adjacent roller 82.

In such a configuration, as long as the roller 81 extends parallel to the other roller 82, the axial end of the roller 81 remains in an initial operational position 81A. At this point, the slidable member 83 remains in an initial operational position 83A to contact the stationary guide member 84 at a point of contact Q.

As the roller 81 is inclined generally downward in the vertical trans-axial direction X, the axial end of the roller 81 is displaced to a displacement position 81B. Note that, at this point, the slidable member 83, which is displaced to a corresponding displacement position 83B, contacts the stationary guide member 84 at the same point of contact Q as that observed before inclination of the roller 81.

Thus, the slidable member 83 and the stationary guide member 84 contact each other at the fixed point of contact Q as the slidable member 83 slides against the stationary guide member 84 along their interfacial surfaces. Failure to vary the point of contact Q between the slidable member 83 and the stationary guide member 84 results in concentration of loads on a particular point across the guide surface, leading to accelerated abrasion and damage to the stationary guide member 84.

Although a particular configuration has been illustrated, the belt tracking system 50 according to this patent specification may be configured otherwise than that described herein. For example, instead of providing the belt tracking system 50 to only one axial end of a specific roller, the belt tracking system 50 may be operatively connected to each of two axial ends of the roller. Further, the belt tracking system 50 may be provided to more than one of the plurality of generally parallel rollers about which the movable belt is entrained.

Moreover, the belt tracking system 50 may be employed in any type of imaging equipment incorporating a multi-roller belt-support assembly, such as an intermediate transfer unit for transferring a toner image from a photoconductive surface, a conveyance unit for conveying a recording medium, and a fixing unit for fixing a toner image in place on a recording medium, included in the image forming apparatus, such as a photocopier, facsimile machine, printer, plotter, or multifunctional machine incorporating several of these features.

In each of those alternative embodiments, various beneficial effects may be obtained owing to provision of the rotation restrictor 47 and other aspects of the belt tracking system 50 according to this patent specification.

Numerous additional modifications and variations are possible in light of the above teachings. It is therefore to be understood that, within the scope of the appended claims, the disclosure of this patent specification may be practiced otherwise than as specifically described herein.

What is claimed is:

1. A belt tracking system for controlling the lateral position of a movable belt entrained about a plurality of generally parallel rollers for moving in a trans-axial direction perpendicular to an axial direction in which the rollers extend parallel to each other, the system comprising:
   a roller shaft extending outward in the axial direction from an axial end of a specific one of the plurality of generally parallel rollers;
   a slidable member slidably disposed around the roller shaft to move along the roller shaft as the belt moves laterally outward in the axial direction;
   a rotation restrictor disposed adjacent to the slidable member to restrict rotation of the slidable member around the roller shaft; and
   a stationary guide member fixed in position adjacent to the roller shaft to define a guide surface therealong,
   wherein the slidable member is slidable against the stationary guide member to cause the roller shaft to move in a direction perpendicular to the axial direction upon lateral displacement of the movable belt, and
   wherein the stationary guide member is fixed relative to the movement of the roller shaft in the direction perpendicular to the axial direction.

2. The system according to claim 1, wherein the rotation restrictor is fixed in rotational position relative to the roller shaft.

3. The system according to claim 1, wherein the rotation restrictor is integrally connected with a fixed member fixed in rotational position relative to the roller shaft.

4. The system according to claim 1, wherein the rotation restrictor comprises a flange extending from a fixed member fixed in rotational position relative to the roller shaft to contact the slidable member.

5. The system according to claim 1, wherein the rotation restrictor comprises a flange extending from the slidable member to contact a fixed member fixed in rotational position relative to the roller shaft.

6. The system according to claim 1, further comprising:
   a bearing disposed around the roller shaft; and
   an elastic bias member connected to the bearing to exert a biasing force on the roller shaft which elastically biases the roller against the belt,
   wherein the rotation restrictor is integrally connected with the bearing.

7. The system according to claim 1, further comprising:
   a positioning flange operatively connected to the axial end of the roller to define a contact surface therealong extending generally perpendicular to the axial direction to contact an adjacent edge of the belt,
   wherein the rotation restrictor is integrally connected with the positioning flange.

8. The system according to claim 1,
   wherein the slidable member is co-movably coupled with the roller shaft to define an inclined surface therealong inclined relative to the axial direction,
   the slidable member being slidable against the stationary guide member along the inclined surface.

9. The system according to claim 8, wherein the rotation restrictor is integrally connected with the stationary guide member.

10. The system according to claim 8, wherein the inclined surface comprises a curved inclined surface selected from the group consisting of a conical surface, a cylindrical surface, a spherical surface, and combinations thereof.

11. The system according to claim 8, wherein the movable belt is entrained about at least three generally parallel rollers, such that the axial end of the roller is movable in an elliptical path whose foci coincide with adjacent two of the at least three generally parallel rollers.

12. The system according to claim 11, wherein the guide surface extends at an oblique angle with respect to a common tangential line between the elliptical path and the axial end of the roller where the roller extends parallel to the adjacent two of the at least three generally parallel rollers.

13. The system according to claim 8, wherein the slidable member and the stationary guide member contact each other at different points of contact as the slidable member slides against the stationary guide member along the inclined surface and the guide surface.

14. An image forming apparatus employing the belt tracking system according to claim 1.

15. A multi-roller assembly for supporting a movable belt, the assembly comprising:
   a plurality of generally parallel rollers about which the movable belt is entrained for moving in a trans-axial direction perpendicular to an axial direction in which the rollers extend parallel to each other; and
   a belt tracking system operatively connected to an axial end of a specific one of the plurality of generally parallel rollers to control the lateral position of the belt by inclining the roller with respect to others of the plurality of generally parallel rollers, the system including:
      a roller shaft extending outward in the axial direction from the axial end of the specific one of the plurality of generally parallel rollers;
      a slidable member slidably disposed around the roller shaft to move along the roller shaft as the belt moves laterally outward in the axial direction;
      a rotation restrictor disposed adjacent to the slidable member to restrict rotation of the slidable member around the roller shaft; and
      a stationary guide member fixed in position adjacent to the roller shaft to define a guide surface therealong,
   wherein the slidable member is slidable against the stationary guide member to cause the roller shaft to move in a direction perpendicular to the axial direction upon lateral displacement of the movable belt, and
   wherein the stationary guide member is fixed relative to the movement of the roller shaft in the direction perpendicular to the axial direction.

* * * * *